United States Patent
Ghotge et al.

(10) Patent No.: US 7,293,044 B2
(45) Date of Patent: Nov. 6, 2007

(54) METHOD AND SYSTEM FOR VERIFYING INTEGRITY OF STORAGE

(75) Inventors: Vishal Vikram Ghotge, Bellevue, WA (US); David P. Golds, Redmond, WA (US); Sarosh Cyrus Havewala, Redmond, WA (US); Christopher F. Robert, Newcastle, WA (US); Paul Adrian Oltean, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 525 days.

(21) Appl. No.: 10/821,303

(22) Filed: Apr. 9, 2004

(65) Prior Publication Data
US 2005/0228832 A1    Oct. 13, 2005

(51) Int. Cl.
*G06F 12/00* (2006.01)
*G06F 17/30* (2006.01)
(52) U.S. Cl. .................. 707/200; 707/202; 707/204
(58) Field of Classification Search ............... 707/200, 707/202, 204
See application file for complete search history.

(56) References Cited

U.S. PATENT DOCUMENTS

| | | | | |
|---|---|---|---|---|
| 5,991,774 A * | 11/1999 | Tate et al. | ................. | 707/203 |
| 6,014,669 A * | 1/2000 | Slaughter et al. | ............. | 707/10 |
| 6,377,958 B1 * | 4/2002 | Orcutt | ........................ | 707/200 |
| 6,799,258 B1 * | 9/2004 | Linde | .......................... | 711/162 |
| 6,981,114 B1 * | 12/2005 | Wu et al. | ................... | 711/162 |
| 2003/0167439 A1 * | 9/2003 | Talagala et al. | ............ | 714/770 |

\* cited by examiner

*Primary Examiner*—Apu Mofiz
*Assistant Examiner*—Jared M Bibbee
(74) *Attorney, Agent, or Firm*—Workman Nydegger (57) ABSTRACT

A method and system for verifying the integrity of a storage volume. When volume verification is desired, a shadow copy of the volume is created. A verification tool operates on the shadow copy and provides a report that indicates if any errors are found in the shadow copy. If errors are found on the shadow copy, this indicates that the same errors likely still exist on the live volume. In the event of errors, a system administrator or the like may take the live volume off-line and fix the errors found.

28 Claims, 7 Drawing Sheets

METHOD AND SYSTEM FOR VERIFYING INTEGRITY OF STORAGE

FIELD OF THE INVENTION

The invention relates generally to computers, and more particularly to storage verification.

BACKGROUND

Increasingly, computer systems are required to be continually on-line and available. This is particularly true for enterprise servers, where downtime may lead to poor productivity and/or poor customer satisfaction. At the same time, administrators (and the like) of enterprise servers like to periodically check the storage of such servers to determine if any errors have crept into the file system stored thereon. If a corruption remains unfixed, it may get worse as the file system is accessed or modified.

In the past, a system administrator generally had two options for verifying the integrity of a volume. As a first option, the system administrator could bring the volume off-line, execute diagnostic software, fix errors, and then bring the volume on-line again. This, however, has the undesirable effect of making the volume unavailable. For some types of volumes (e.g., a corporate e-mail volume), this solution may virtually halt work and productivity for an entire organization for the duration of the procedure.

As a second option, the system administrator could perform a read-only integrity check on a live volume. Because of the changing nature of files and meta-data on a live volume, this option also has problems, including falsely indicating that errors exist on a volume and aborting the integrity check because of problems encountered while attempting to verify the volume. Falsely indicating that errors exist on a volume may be worse than no indication at all, because it may cause a system administrator to take the system off-line only to find that nothing was wrong. In such a scenario, taking the system off-line to check for errors based on a false report from a diagnostic program may halt productivity. In an even worse scenario, doing so may also destroy system administrator confidence in the diagnostic tool and cause the system administrator to ignore future true errors reported by the diagnostic program.

What is needed is a method and system for verifying a volume without taking the volume off-line. Ideally, the method and system would report problems that actually exist.

SUMMARY

Briefly, the present invention provides a method and system for verifying the integrity of a volume while the volume is on-line. When volume verification is desired, a shadow copy of the volume is created. A verification tool operates on the shadow copy and provides a report that indicates whether any errors are found in the shadow copy. If errors are found on the shadow copy, this indicates that the same errors likely still exist on the live volume (unless they have been corrected since the shadow copy was created). In the event of errors, a system administrator or the like may take the live volume off-line and fix the errors found.

In one aspect of the invention, no false reports of errors are generated while verifying the integrity of a volume. This results, in part, by examining a shadow copy of the volume instead of attempting to examine the volume itself.

In another aspect of the invention, the volume may be on-line and utilized while the verification process is proceeding.

Other advantages will become apparent from the following detailed description when taken in conjunction with the drawings, in which:

DETAILED DESCRIPTION

Exemplary Operating Environment

Figure 1:
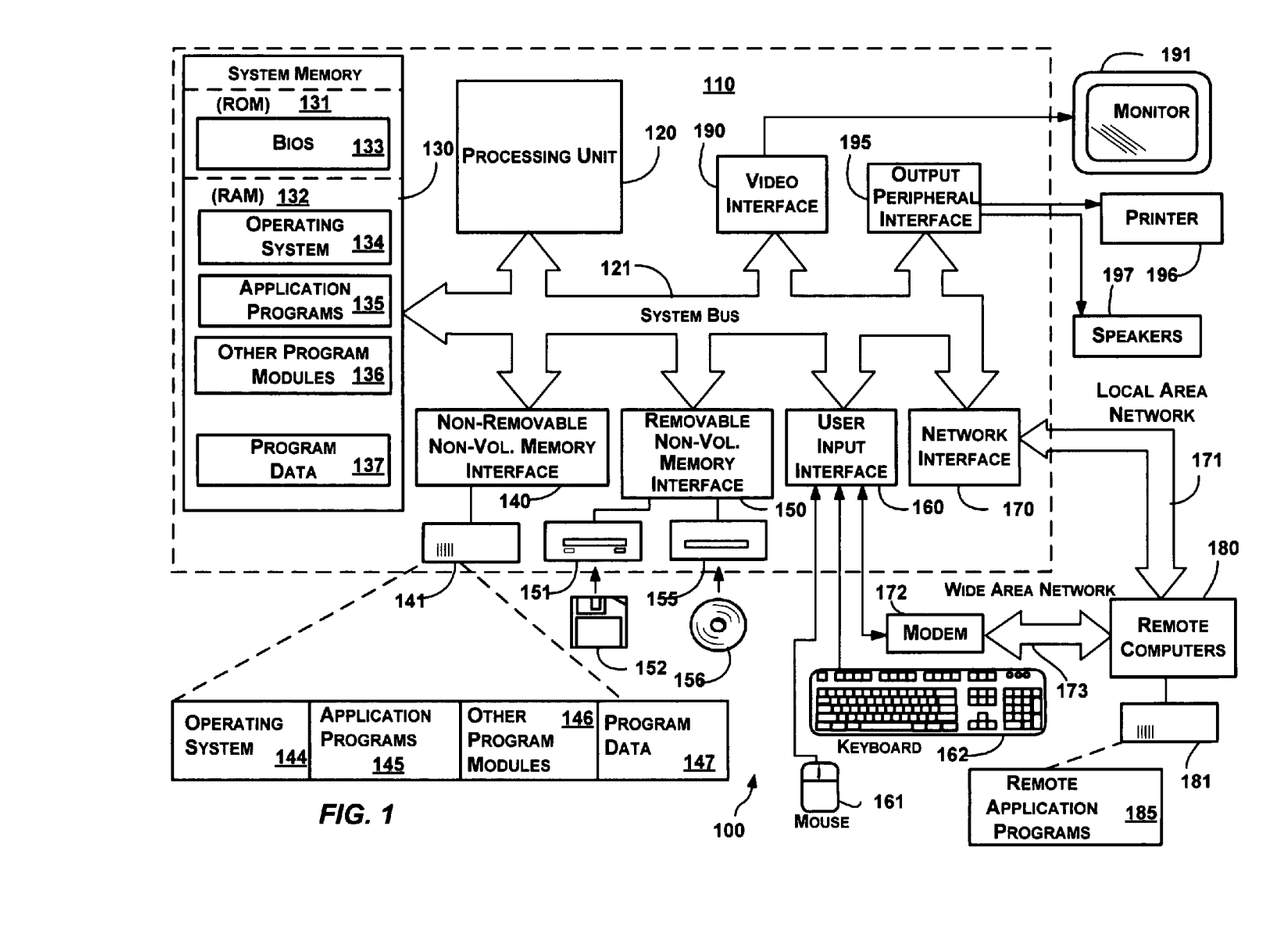
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, mobile devices, embedded systems, virtual machines, virtual execution environments that simulate computer hardware, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Volume Verification

In contemporary storage technology, at least two types of storage volumes exist: volumes formatted with a file system and raw volumes. A volume may reside on one storage device (sometimes referred to as a disk) or may span multiple disks. One disk may be used by one or more volumes. As used herein, the term volume may refer to a formatted volume, a raw volume, or some other kind of volume.

A formatted volume may be divided into clusters, in which a cluster is a block of data having a fixed size. Each cluster may include one or more sectors. A sector is the minimum amount of data that can be requested to be read from or written to a storage device at one time.

While aspects of the invention will be described with reference to a particular type of file system (e.g., one including meta-data and objects associated therewith), it will be understood the present invention is not limited to this particular type of file system. Indeed, the present invention may be practiced with any formatted or raw volumes. A formatted volume may be formatted using any format, including FAT, NTFS, UDFS, a file system for UNIX®, LINUX®, OS/2®, BeOS®, or any other operating system, a third party file system, and the like without departing from the spirit or scope of the invention.

In one exemplary file system, a volume may include a set of objects and meta-data associated with the objects. An object may comprise a file or a stream, depending on the file system semantics. The meta-data may be stored in various places within the volume. As used herein, one such place will sometimes be referred to as the master file table (MFT). The meta-data may include data that defines the MFT data structure and where various parts of the MFT may be found, data that locates the objects on a physical storage device, information that provides a hierarchy for objects stored in the volume (e.g., whether each object is a directory or a file and which directory each object is included in), object security data that indicates which users or groups may access each object, data pertaining to the root directory of the volume, data pertaining to user files contained in the volume, and other information associated with the objects.

A raw volume is set of data that may span a portion of a physical disk, all of a physical disk, or portions or all of multiple physical disks. In some embodiments, a raw volume is only a disk and includes any information found on the disk, including partition information. In some embodiments, a raw volume does not include any file system structure meta-data thereon. For example, a database may store data on a raw volume and may itself maintain how the data is stored on the raw volume rather than making use of a file system. In other embodiments, a raw volume may include one or more file system structures. For example, a raw volume may comprise a single physical disk that includes multiple formatted volumes (e.g., a multi-boot formatted disk). In this example, checking the integrity of a raw volume may be synonymous with checking the integrity of a disk. In checking the integrity of a raw volume, information in the meta-data included in the raw volume, if any, is not used in any special way in verifying the integrity of the raw volume.

Occasionally, volumes have errors. Volume errors include, for example, inconsistency in data stored on the volume. Volume errors may occur because of many reasons, including power failure or one or more disks going bad. For example, if there is a power failure or other problem when writing to the meta-data of a volume, an object may have an entry in the meta-data that indicates that the object exists, but it may lack an entry that indicates what directory contains the object. Conversely, an object may have an entry in the meta-data that indicates that a particular directory contains the object, but it may lack an entry that indicates the attributes of the object, such as where on the physical disk the object exists. The present invention, however, is not limited to dealing with power failures that introduce such errors in a volume; rather it will be understood that aspects of the invention may be used to detect any data consistency errors that may occur with respect to volumes, without departing from the spirit or scope of the present invention.

Volume verification tools may be used to locate and/or fix errors. Some volume verification tools have several modes of operation. For example, CHKDSK, a Microsoft Corporation utility, may run in read-only mode, fix mode, or recovery mode. In read-only mode, CHKDSK reads the meta-data of a volume and attempts to locate problems like those described above. If CHKDSK finds a problem, it reports on the problem but does not attempt to fix the problem.

When operating in read-only mode, CHKDSK typically operates on a live volume. One of the primary challenges facing read-only CHKDSK on a live volume is to distinguish between real file system inconsistencies and non-existent inconsistencies that appear to be inconsistencies due to the transient nature of a live volume. An inconsistency may appear when there are concurrent writes to a volume while the verification tool is reading the contents of the volume. For example, CHKDSK may read information (e.g., a pointer or index) in a directory entry in the meta-data that indicates that a file entry in the meta-data is associated with the directory entry. Upon searching for the file entry, it may find that the file entry does not exist or does not have information (e.g., a pointer or index) associating it with the directory entry. This may occur because of the changing nature of a live volume. CHKDSK may have read the meta-data right after an entry was inserted or modified that indicated that the directory included the file but before an entry was inserted or modified for the file. As CHKDSK does not know that the file entry will shortly be inserted or modified, it may falsely flag this as a volume error. Alternatively, because of the changing nature of the meta-data of a live volume, CHKDSK may simply abort and indicate that it does not have enough information as to whether a problem exists on the volume.

In fix mode, CHKDSK attempts to locate problems and fix them. In doing so, CHKDSK attempts to lock the volume. If CHKDSK fails because the volume is busy or because the volume is a system or boot volume, CHKDSK may schedule a scan of the volume at boot time and delay execution until the machine is rebooted by an administrator or the like. If CHKDSK is executed in fix mode and the volume is in use but it is not a system volume, CHKDSK may prompt as to whether the volume should be dismounted before being checked. If the volume is dismounted all open handles to the volume may be invalidated. If the volume is not dismounted or the dismount fails, then CHKDSK may prompt to schedule checking the volume at boot time. An administrator or the like can then decide to restart the system so that the volume is checked and fixed at boot time.

When CHKDSK is executed in read-only mode on a live volume, CHKDSK frequently reports non-existent errors. Consequently an administrator or the like may be forced to run CHKDSK in fix mode and go through the process mentioned above to fix potential errors. If the volume had no real errors, then this wastes time and unnecessarily wastes resources for the volume. Aspects of the present invention allow CHKDSK or a similar utility to be executed in read-only mode on a shadow copy of a live volume, and in almost all cases eliminate false alarms and waste of time and resources that may occur from unnecessarily executing a volume-fixing utility.

When a volume is locked, other users and programs cannot use the volume, so in essence the volume is off-line to all other users and programs. As one example of an error that CHKDSK may fix, when CHKDSK finds a file entry that indicates that the file entry is associated with a particular directory entry but also finds that that there is no directory entry or that the directory entry is not associated with the file entry, CHKDSK may attempt to modify the directory entry to associate the file entry with the directory entry.

In recovery mode, areas other than the MFT may be scanned in an attempt to recover errors that result from unreadable clusters, to verify and detect unusable clusters in free space, and the like.

In an embodiment of the invention, when checking a volume, a shadow copy is created. A shadow copy is essentially a "snap-shot" of a volume. Logically, a shadow copy is an exact duplicate of a volume at a given point in time, even though the volume may not be entirely copied (e.g., via copy-on-write) in creating the shadow copy. A shadow copy may be viewed as a separate volume by the operating system and any executing applications. For example, a shadow copy may have a volume device, a volume name, a drive letter, a mount point, and any other attribute of an actual volume. After a shadow copy is created, volume verification is performed by using the shadow copy. For example, volume verification may be performed by a tool similar to CHKDSK that identifies errors on the shadow copy.

Figure 2:
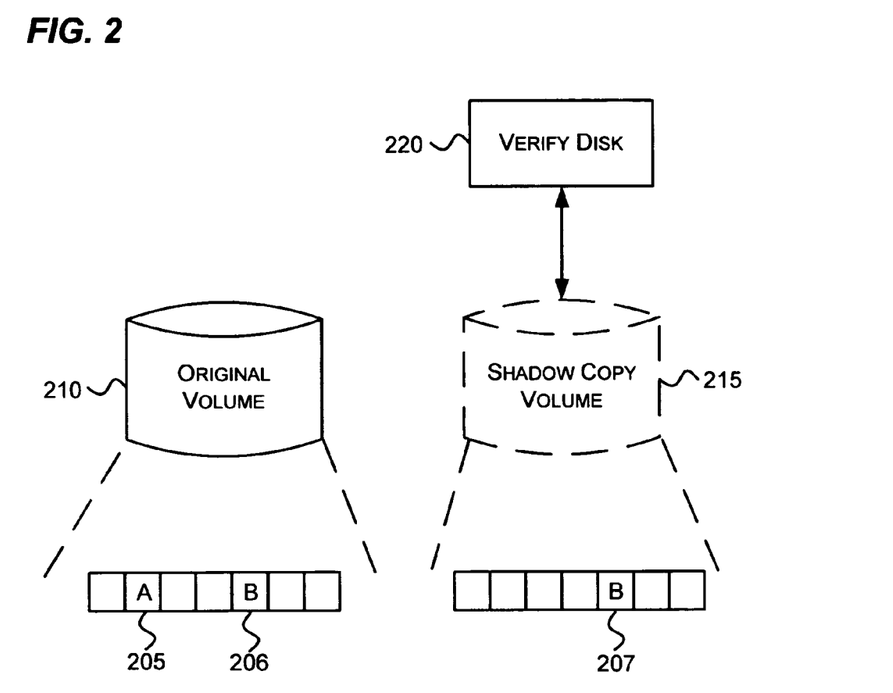
FIG. 2 is a block diagram representing a volume and its shadow copy in accordance with various aspects of the invention.

A shadow copy may be created by various well-known techniques, including copy-on-write, split mirror, specialized hardware that creates a copy of the disk itself, and other methods and systems known to those skilled in the art. Referring to FIG. 2, in copy-on-write, a driver divides a disk into blocks (e.g., 16K blocks). If a block on the disk changes after creation of the shadow copy, before the block is changed, it is copied to a storage location accessible by the shadow copy provider. For a particular shadow copy, a block is only copied the first time it changes. When a request for information in the shadow copy is received, first, a check is performed to determine if the block has changed in the original volume. If not, data from the original volume is retrieved and returned. If the block has been changed, data from the storage location used by the shadow copy volume is retrieved and returned.

Shadow copies are not limited to volumes with file systems. Indeed, a shadow copy of a raw volume may also be created. For example, a database or other application that uses a raw volume may have its own data verification tool, which may be used on the shadow copy of the raw volume created. Logically, a shadow copy of a raw volume is an exact duplicate of the raw volume at the time the shadow copy is created. A shadow copy of a raw volume may be created and maintained by the techniques described above.

In FIG. 2, the block 205 has not changed since a shadow copy volume 215 was created. Thus, if an application, such as verify disk 220, requested the block 205 from the shadow copy volume 215, data from the original volume 210 would be returned to the application. The block containing data element B (e.g. block 206) has changed since the time that the shadow copy volume 215 was created. Thus, if an application requested the block 206 from the shadow copy volume 215, it would be given data from the block 207.

As shadow copy techniques are well known in the art, other methods of creating shadow copies will not be described in further detail here.

It will be recognized that checking the integrity of a volume using a shadow copy has several advantages. First, the verification tool is assured that the shadow copy will not change while it is being verified. Second, while verifying the shadow copy volume, the original volume is free to be changed by users as the shadow copy is being used. Other advantages will be apparent from a review of the following material.

Figure 3:
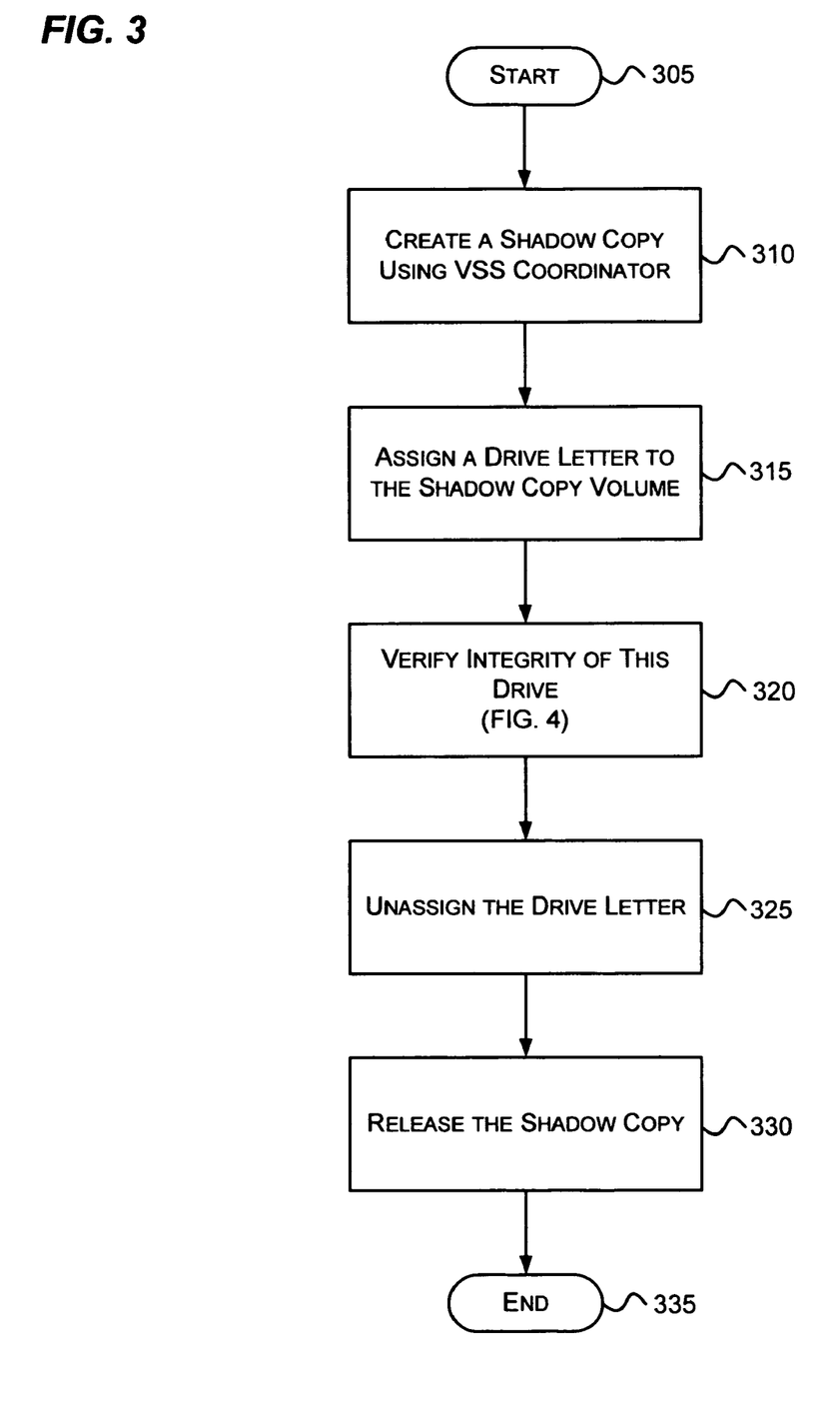
FIGS. 3 and 4 are dataflow diagrams that generally represent exemplary steps that may occur when verifying the integrity of a volume in accordance with various aspects of the invention.
Figure 4:
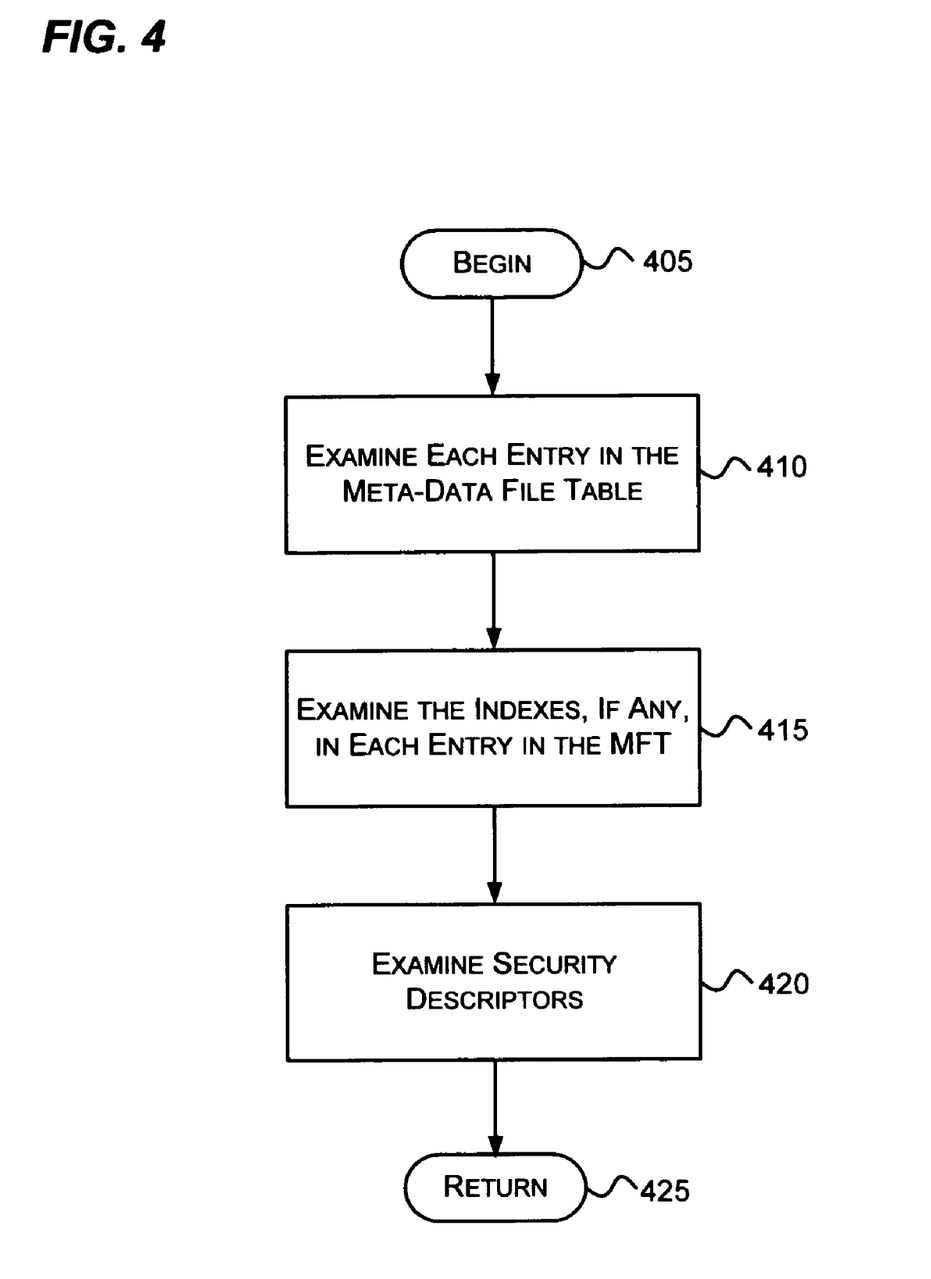

FIGS. 3 and 4 are dataflow diagrams that generally represent exemplary steps that may occur when verifying the integrity of a volume in accordance with various aspects of the invention. The process begins at block 305 when checking the integrity of a volume is desired.

At block 310 a shadow copy of the volume is created. This may be created using any shadow copy tool including Microsoft's VSS coordinator tool.

At block 315, a drive letter may be assigned to the shadow copy volume. When verify disk is used to verify the integrity of a volume, a drive letter may be assigned so that verify disk may access the volume normally. In other embodiments of the invention, a drive letter may or may not be assigned as the volume verification tool may or may not require a drive letter to access the volume. In such other embodiments, other actions, if any, are taken to put the shadow copy in a format suitable for the appropriate verification tool.

At block 320, the integrity of the drive is verified as described in further detail in conjunction with FIG. 4. In the process of verifying the volume, a report may be generated that indicates the errors that were found, if any. These errors may then be fixed, if desired, by taking the actual volume off-line and running a volume fixing utility, such as CHKDSK, in fix mode.

At block 325, the drive letter is unassigned, if needed. In some embodiments where no drive letter has been assigned, other actions may be taken to free resources and the like.

At block 330, the shadow copy is released or deleted. At block 335, the process ends.

In some embodiments of the invention, an NTFS or FAT volume is verified for integrity using the method above. The invention, however, is not limited to NTFS or FAT volumes. Rather, the method described above may be used with any volume format or raw volume, any shadow copy mechanism, and any volume verification tool by modifying the steps appropriately. A pertinent aspect is that the verification tool be suitable to verify the integrity of the shadow volume created by the shadow copy mechanism.

Referring to FIG. 4, the process is called at block 405 when a shadow copy of a volume is ready to be verified.

At block 410, each entry in the MFT is examined for consistency. The header and attributes of each entry in the MFT may be checked. For example, the header may indicate that an entry has a certain length which may not agree with other data that indicates how long the entry is. An attribute of an entry in the MFT may indicate that a file name is a certain length whereas other data indicates that the file name is longer than the specified length. In addition, a check may be performed as to the readability of each record. A disk error may cause an MFT entry to become unreadable. If any errors are found, they may be reported by the verification mechanism.

At block 415, the indexes (or pointers), if any, of each entry are checked. An index entry that points to another entry that does not exist may indicate an error. For example, if a directory entry indicates that a file entry exists and the file entry is missing, this may indicate that the MFT has become corrupted. Similarly, if a child entry indicates that it belongs to a particular directory, but the directory entry does not so indicate (or is missing), this may also indicate that the MFT has become corrupted.

At block 420, security descriptors are checked. A security descriptor indicates access rights that may be associated with a user or set of users. Each entry in the MFT may refer to a security descriptor to indicate the access rights associated with that entry. If the security descriptor referred to by an entry does not exist, this may indicate that the MFT has become corrupted. In addition, if a security descriptor exists which no entry indexes, this may indicate a security descriptor that is no longer needed and was not properly deleted. At block 425, the process returns.

It will be recognized that any volume verification tool may benefit from the process described in conjunction with FIGS. 3 and 4. It will be readily understood by those skilled in the art that variations may be made in the steps described to meet the needs of a particular volume verification tool without departing from the spirit or scope of the invention.

Figure 5:
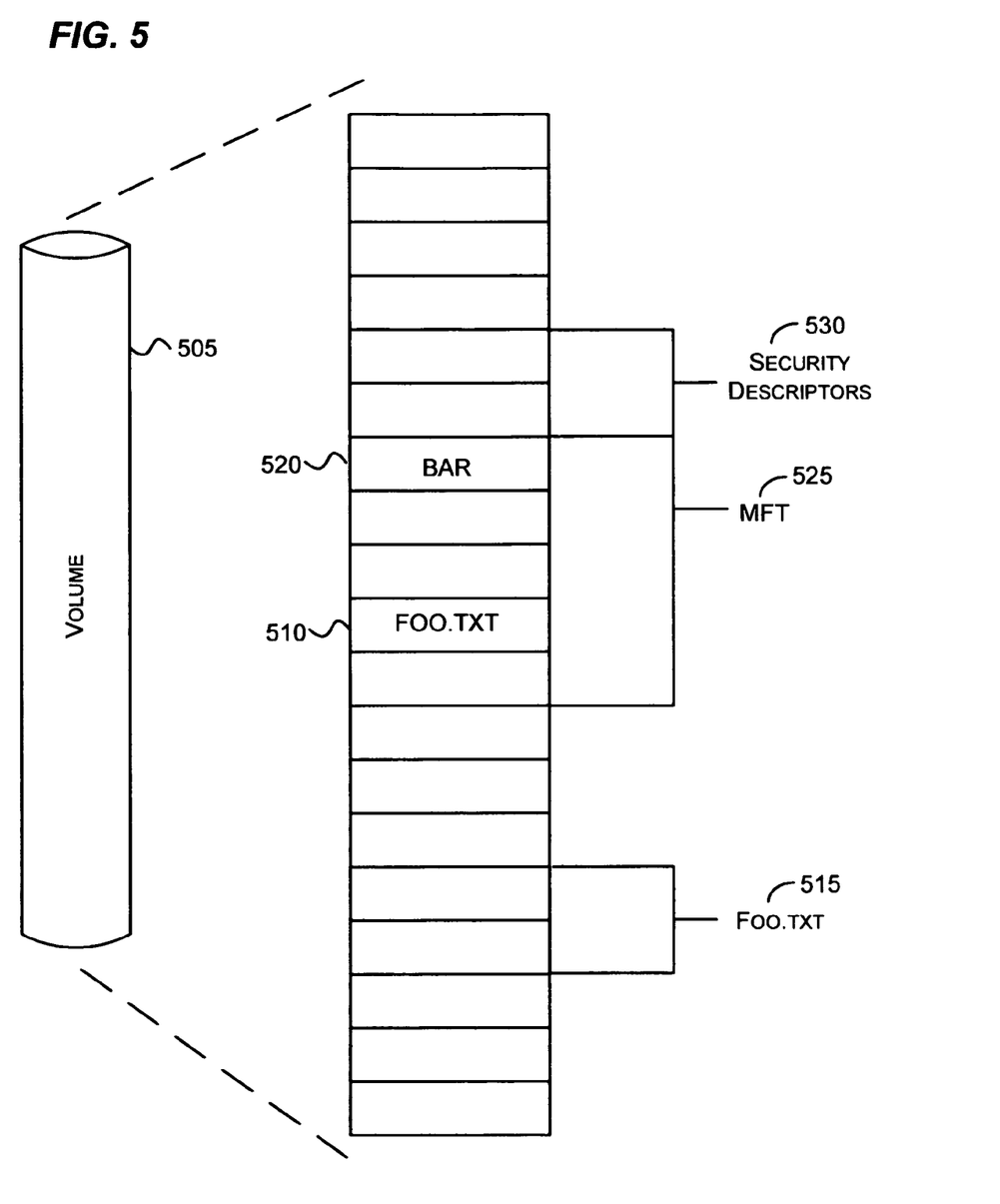
FIG. 5 is a block diagram illustrating an exemplary volume in accordance with various aspects of the invention.

FIG. 5 is a block diagram illustrating an exemplary volume in accordance with various aspects of the invention. A file 515 called foo.txt may be created as a user file on the volume 505. Foo.txt may occupy one or more clusters on the volume. In conjunction with creating the file foo.txt, the file system may create an entry 510 in the MFT 525. The entry 510 may include information such as the name of the file, the file create date, the size of the file, the extents of the file (i.e., the clusters occupied by the file), and any other attributes of the file.

The file 515 may be created in a directory, e.g., named "bar." The bar directory will also have an entry 520 in the MFT 525. Bar will have an index for quickly locating the entry 510 for foo.txt. Entry 510 may also have a pointer to the entry 520 for the directory (e.g., bar) in which it resides.

In addition, each entry in the MFT 525 may refer to one of the security descriptors 530. Each security descriptor may include information that indicates which users or groups may access the object associated with the entry that refers to the security descriptor.

Figure 6:
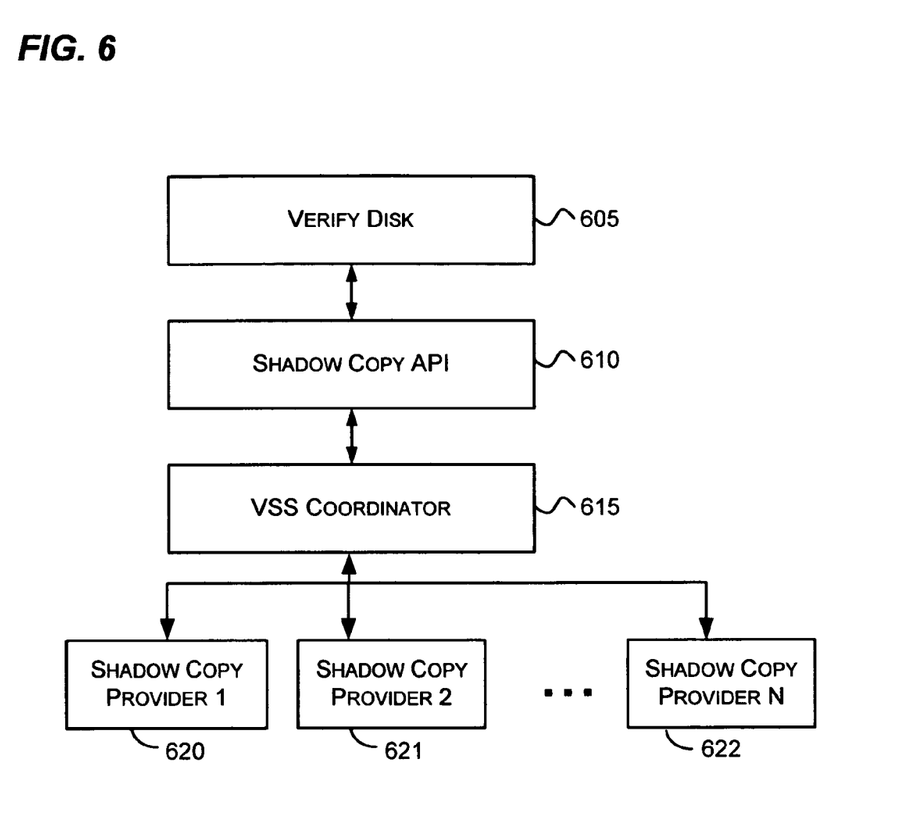
FIG. 6 is a block diagram that illustrates exemplary components that may be used to practice the invention in accordance with various aspects of the invention.

FIG. 6 is a block diagram that illustrates exemplary components that may be used to practice the invention in accordance with various aspects of the invention. A verify disk component 605 interacts with a shadow copy API 610 to request that a shadow copy of a particular volume be created. The shadow copy API 610 interacts with VSS coordinator 615 to instruct volume shadow copy service (VSS) coordinator 615 to create the shadow copy using a particular shadow copy provider. The VSS coordinator 615 has the selected shadow copy provider (e.g., one of shadow copy providers 620-622) create a shadow copy. This information is then returned to the verify disk component 605 which uses the shadow copy to verify the integrity of a volume. After the verify disk component 605 has finished, it may interact with the shadow copy API 610 to delete the shadow copy.

The shadow copy API 610 includes an interface for interfacing with low level shadow copy routines. The shadow copy API 610 provides a common interface that does not need to change with each change of a low level shadow copy routine. The shadow copy API 610 may expose such calls as create, query, delete, and other operations that modify the properties of the shadow copy.

The VSS coordinator 615 is a volume shadow copy service. The VSS coordinator 615 allows developers to create shadow copy components (e.g., shadow copy providers 620-622) and plug these components into the VSS coordinator 615. Each shadow copy component exposes a set of APIs to the VSS coordinator 615 which the VSS coordinator 615 may use to interact with the shadow copy provided by the shadow copy component. In one implementation, the VSS coordinator 615 may be considered to be a thin, high level wrapper around the low level APIs provided by the shadow copy components. For example, the VSS coordinator 615 may translate high-level shadow copy management operations on volumes into low-level shadow copy operations on logical address units (LUNs).

In one embodiment of the invention, the VSS coordinator 615 interfaces with a shadow copy provider provided by Microsoft Corporation called the Microsoft Shadow Copy (MSSC) Provider.

Figure 7:
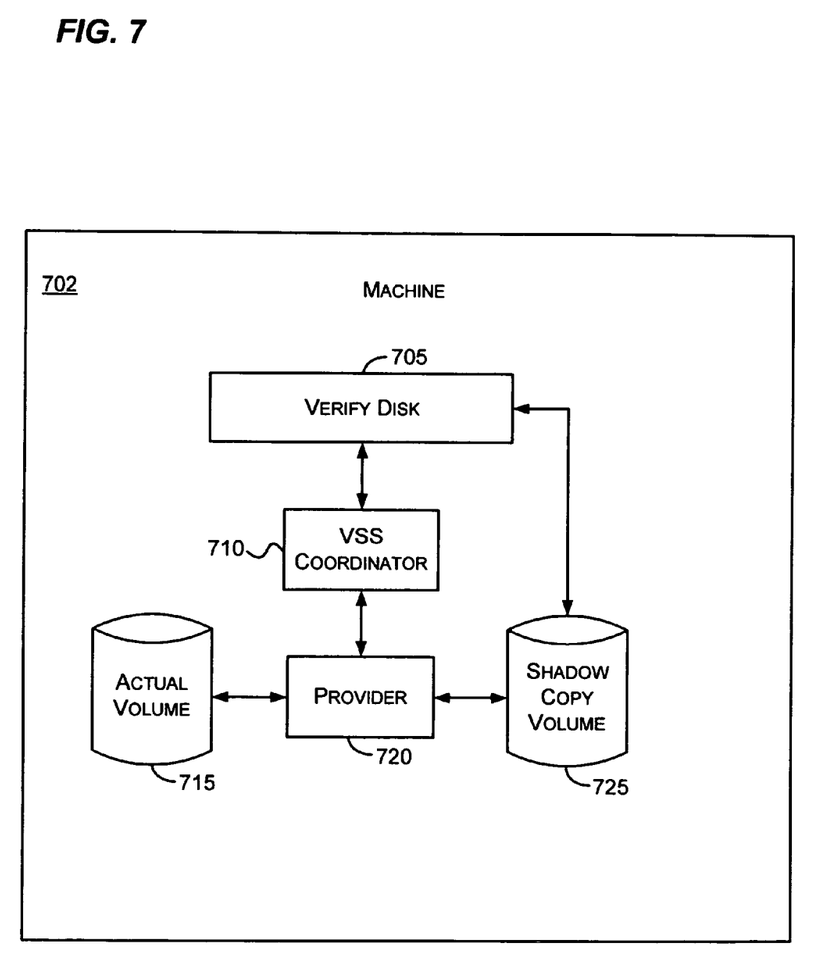
FIG. 7 is a block diagram that illustrates an exemplary environment in which the invention may be practiced.

FIG. 7 is a block diagram that illustrates an exemplary environment in which the invention may be practiced. A machine 702 includes a verify disk component 705 that interfaces with VSS 710. The VSS 710 selects a provider 720 to make a shadow copy volume 725 of actual volume 715. After the shadow copy volume 725 is created, the verify disk component 705 verifies the integrity of the shadow copy volume 725 and may provide a report (not shown) that indicates errors, if any, that are found on the shadow copy volume 725.

It will be recognized that other variations of the machine 702 shown in FIG. 7 may be implemented without departing from the spirit or scope of the invention.

It will also be understood that aspects of the invention described herein may be applied to verifying the integrity of a disk. A shadow copy of the disk may be created, and a disk verification tool may examine the shadow copy for any errors. The disk verification tool may verify the integrity of data structures related to one or more partitions, data structures related to a volume manager, and other data structures not normally included in a formatted volume. The integrity of a disk may be verified while the disk is on-line. If errors are found in the shadow copy of the disk, the disk may be taken off-line and the errors corrected.

As can be seen from the foregoing detailed description, there is provided an improved method and system for verifying the integrity of storage in a computer system. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing system that runs a diagnostic program for determining errors on a live volume, a computer program product residing on a physical computer storage medium for implementing, a method of ensuring against false error reporting during an online verification process by finding errors in a shadow copy of the live volume, the computer program product comprising one or more computer readable storage media having stored thereon computer executable instructions that, when executed by a processor, can cause the distributed computing system to perform the following:

receive a request to run a verification tool on a live volume in order to determine if errors exist thereon;

based on the received request, create a shadow copy of the live volume, which provides a logical duplicate of the live volume at a point in time, and wherein the shadow copy is divided into a plurality of blocks;

examine the shadow copy to verify an integrity of the live volume, wherein the shadow copy does not change during examination, but users still have access to the live volume during the integrity verification, wherein examination of the shadow copy can cause the distributed computing system to further perform the following:

receive a request for examining each of the plurality of blocks in the shadow copy;

determine if at least one block has changed in the live volume since the creation of the shadow copy, wherein if at least one block has not changed data for the plurality of blocks are retrieved and returned from the live volume, and wherein if at least one block has changed an unchanged version of the at least one block is retrieved and returned from a storage location where the at least one block was copied before it changed; and based on the determination of whether or not the at least one block has changed, examine the plurality of blocks to verify an integrity of the live volume; and based on the examination of the shadow copy, generate a report on the integrity of the live volume, which indicates to a user that one or more errors were found and that the live volume should be taken off-line in order to fix the one or more errors.

2. The computer program product of claim 1, wherein the live volume is changed while examining the shadow copy to verify an integrity of the volume and wherein verifying the integrity is unaffected by any changes to the volume.

3. The computer program product of claim 1, wherein the live volume includes meta-data that comprises entries, wherein at least some of the entries comprise file and directory entries.

4. The computer program product of claim 3, wherein examining the shadow copy to verify an integrity of the live volume comprises searching the meta-data for file entries which no directory entry indexes.

5. The computer-program product of claim 4, wherein examining the shadow copy to verify an integrity of the live volume comprises searching the meta-data for directory entries which index a file entry wherein the file entry does not index the directory entry.

6. The computer program product of claim 4, wherein examining the shadow copy to verify an integrity of the live volume comprises searching the meta-data for a directory entry which is indexed by a file entry, wherein the directory entry does not index the file entry.

7. The computer program product of claim 3, wherein at least some of the entries comprise attributes of an object associated with the entry, wherein examining the shadow copy to verify an integrity of the live volume comprises examining the at least some of the entries to verify that attributes included in each entry are correct.

8. The computer program product of claim 7, wherein one of the attributes comprises a length of a name of an object associated with the entry including the attribute.

9. The computer program product of claim 3, wherein examining the shadow copy to verify an integrity of the live volume comprises searching for unreadable entries in the meta-data.

10. The computer program product of claim 3, wherein the live volume includes meta-data that comprises entries and wherein examining the shadow copy to verify an integrity of the live volume comprises searching the entries for unreferenced security descriptors.

11. The computer program product of claim 3, wherein the meta-data indicates a hierarchy of the objects contained on the volume.

12. The computer program product of claim 3, wherein the meta-data indicates where objects are stored on the live volume.

13. The computer program product of claim 3, wherein the meta-data includes a security descriptor that indicates access rights associated with at least one object on the live volume.

14. The computer program product of claim 1 wherein the live volume comprises a raw volume.

15. The computer program product of claim 14, wherein the raw volume lacks a table that identifies objects contained on the live volume.

16. The computer program product of claim 14, wherein the raw volume includes a disk including partition information.

17. The computer program product of claim 14, wherein the live volume is accessed by a database engine.

18. The computer program product of claim 17, wherein examining the shadow copy to verify an integrity of the live volume comprises the database engine examining the shadow copy.

19. The computer program product of claim 1, wherein the shadow copy maintains data found on the live volume at the selected point in time as the volume changes.

20. The computer program product of claim 1, wherein the shadow copy is created via at least one of a copy-on-write and split mirror.

21. In a computing system that runs a diagnostic program for determining errors on a live volume, a method of ensuring against false error reporting during an online verification process by finding errors in a shadow copy of the live volume, the method comprising:

receiving a request to run a verification tool on a live volume in order to determine if errors exist thereon;

based on the received request, creating a shadow copy of the live volume, the shadow copy comprising a logical duplicate of the live volume at a given point in time, and wherein the shadow copy is divided into a plurality of blocks;

examining the shadow copy to verify an integrity of the live volume, wherein the shadow copy does not change during examination, but users still have access to the live volume during the integrity verification, wherein examination of the shadow copy comprises:

receiving a request for examining each of the plurality of blocks in the shadow copy;

determining if at least one block has changed in the live volume since the creation of the shadow copy, wherein if at least one block has not changed data for the plurality of blocks are retrieved and returned from the live volume, and wherein if at least one block has changed an unchanged version of the at least one block is retrieved and returned from a storage location where the at least one block was copied before it changed; and based on the determination of whether or not the at least one block has changed, examining the plurality of blocks to verify an integrity of the live volume; and based on the examination of the shadow copy, generating a report on the integrity of the live volume, which indicates to a user that one or more errors were found and that the live volume should be taken off-line in order to fix the one or more errors.

22. The method of claim 21, wherein the shadow copy is created by one of a plurality of shadow copy providers that each exist on a system, each shadow copy provider capable of providing a shadow copy of the volume upon command.

23. The method of claim 21, wherein each shadow copy provider is designed to create a shadow copy for a particular type of application.

24. The method of claim 23, wherein the type of application comprises a volume verification application.

25. The method of claim 21, wherein the volume comprises a volume formatted in accordance with FAT, NTFS, or UDFS.

26. The method of claim 21, wherein the volume comprises a volume formatted for UNIX®, LINUX®, OS/2®, or BeOS®.

27. A computing system for running a diagnostic program for determining errors on a live volume, which ensures against false error reporting during an online verification process by finding errors in a shadow copy of the live volume, the system comprising:

a verification tool configured to receive a request to run an error diagnostic on a live volume;

a shadow copy provider arranged to create a shadow copy of a live volume, which provides a logical duplicate of the live volume at a give point in time, and wherein the shadow copy is divided by the shadow copy provider into a plurality of blocks;

an API arranged to interface with the shadow copy provider and to instruct the shadow copy provider to create the shadow copy based on the received request to run the error diagnostic on the live volume;

a verify disk component arranged to verify the integrity of the volume by examining the shadow copy of the volume, wherein the shadow copy does not change during examination, but users still have access to the live volume during the integrity verification, and wherein examination of the shadow copy comprises:

receiving at the verify disk component a request for examining each of the plurality of blocks in the shadow copy;

determining by the verify disk component if at least one block has changed in the live volume since the creation of the shadow copy, wherein if at least one block has not changed data for the plurality of blocks are retrieved and returned from the live volume, and wherein if at least one block has changed an unchanged version of the at least one block is retrieved and returned from a storage location where the at least one block was copied before it changed; and based on the determination of whether or not the at least one block has changed, examining the plurality of blocks to verify an integrity of the live volume; and a report generator for displaying the results of the examination of the integrity of the live volume, which indicates to a user that one or more errors were found and that the live volume should be taken off-line in order to fix the one or more errors.

28. The system of claim 27, wherein the shadow copy is maintained by actions comprising copying each block that changes on the volume to another location before the block changes, wherein a request to read data from the shadow copy for a block that has changed in the volume is satisfied with data from the other location.

* * * * *